US008400966B2

(12) United States Patent
Yosef

(10) Patent No.: US 8,400,966 B2
(45) Date of Patent: Mar. 19, 2013

(54) COMPUTER ASSISTED VOIP COMMUNICATION METHOD AND SYSTEM

(76) Inventor: Itav Yosef, Atlantic Highlands, NJ (US)

( * ) Notice: Subject to any disclaimer, the term of this patent is extended or adjusted under 35 U.S.C. 154(b) by 277 days.

(21) Appl. No.: 12/784,351

(22) Filed: May 20, 2010

(65) Prior Publication Data
US 2010/0303057 A1     Dec. 2, 2010

(30) Foreign Application Priority Data

May 27, 2009   (IL) .......................................... 199020

(51) Int. Cl.
H04W 4/00      (2009.01)
H04B 7/216     (2006.01)
H04L 12/66     (2006.01)

(52) U.S. Cl. .................. 370/328; 370/335; 370/356
(58) Field of Classification Search .................. None
See application file for complete search history.

(56) References Cited

U.S. PATENT DOCUMENTS

| 8,019,279 B2* | 9/2011 | Bauchot et al. | 455/41.2 |
| 2006/0193301 A1* | 8/2006 | Cheng et al. | 370/338 |
| 2007/0036134 A1* | 2/2007 | Huang et al. | 370/352 |
| 2008/0247531 A1* | 10/2008 | Borislow et al. | 379/218.01 |

* cited by examiner

Primary Examiner — Melanie Jagannathan
(74) Attorney, Agent, or Firm — Marsteller & Associates, P.C.

(57) ABSTRACT

A computer assisted VoIP communication method and system. A remote server comprises a database in which is stored generic data of a plurality of displayed mobile phones. A personal computer in communication with the remote server comprises a local memory device in which is storable user-specific data of a known mobile phone, and an input device for selecting a desired mobile phone displayed in the remote website and for downloading the generic data associated with the selected phone to the memory device. Following generation of a virtual phone having a shape, key arrangement and functionality similar to those of the known mobile phone on the computer screen, a type and recipient of a session to be established are defined by virtually selecting a desired number and sequence of keys of the virtual phone or by entering commands. A session is established by a VoIP application residing on the computer.

20 Claims, 5 Drawing Sheets

COMPUTER ASSISTED VOIP COMMUNICATION METHOD AND SYSTEM

FIELD OF THE INVENTION

The present invention relates to the field of communications. More particularly, the invention relates to a method and system for simulating a cellular phone on a personal computer for the purpose of establishing a VoIP communications session.

BACKGROUND OF THE INVENTION

Every year mobile phone users pay wireless providers billions of dollars for their services. By personalizing the mobile phone via contact lists, pictures, calendars, and individual settings, mobile providers have made the users become personally attached to these electronic devices.

Due to these factors of convenience, familiarity and habit, it has been shown that users are more likely to use their mobile phones, even when given the choice of available free or low cost landline or voice over Internet Protocol (VoIP) communications. Indeed, nearly 3 out of every 10 households in the United States are reliant or almost completely dependent on mobile phones, and are willing to pay expensive mobile phone rates at times when the use of a mobile phone is unnecessary. As with using VoIP services, just the task of manually adding the name and phone number of each contact into the address book is both tedious and time consuming and the VoIP interface application is generally not as personal or familiar to a user as his own mobile phone.

Another trend is that in recent years, people have increasingly been spending more time using computers. Computers are readily accessible to users at various locations throughout the day, such as at an office, within one's home, and at recreational facilities, e.g. lounges, bars and coffee shops.

It would therefore be desirable to combine the accessibility of computers and the familiarity and personalization of mobile phones in order to establish a VoIP communications session.

Skydeck, San Mateo, Calif., provides an application for accessing mobile phone data via a website. This application does not, however, generate images appearing similar to the mobile phone of the user, thereby making use of this application less personal and attractive than an actual mobile phone. Moreover, users of the Skydeck application need to interface with a fairly complex computer program, which can be confusing and challenging to many mobile phone users.

DeviceAnywhere, San Mateo, Calif., provides a real-time platform by which mobile phones can be remotely tested. A replica of a mobile phone is displayed, and every input and output thereof is accessible via the Internet, so that buttons can be remotely pressed, liquid crystal displays (LCD) can be viewed, and tones can be heard. The service for performing this function is relatively expensive.

Skype Technologies S.A., Luxembourg, provides an application for supporting VoIP communication by means of a mobile phone.

Users of such an application incur data transmission charges associated with using an Internet based VoIP application that interfaces with their mobile phone. They also incur charges for a local mobile phone call through their carrier, as well as a call connection fee and a subscription fee. Another disadvantage associated with this VoIP communication method is that a call cannot be directly placed by accessing the contact list of the mobile phone. In order to place a call, the user needs to manually enter the number of the intended recipient of the call.

It is an object of the present invention to provide a method and system for establishing a computer assisted communications session.

It is an additional object of the present invention to provide a method and system for establishing a free or low cost communications session while interfacing with personalized settings and contact lists similar to those of the user's mobile phone.

Other objects and advantages of the invention will become apparent as the description proceeds.

SUMMARY OF THE INVENTION

The present invention provides a unique method for establishing a free or relatively inexpensive communications session while interfacing with personalized settings and contact lists similar to those of a known mobile phone.

As referred to herein, a "communication session" includes any operation performed by a conventionally operating mobile phone to transmit communication information from an initiator to a recipient, including but not limited to incoming/outgoing calls, text or file messaging transmissions, and video chats. A session is "established" whether in real-time or offline after the communication information has been transmitted.

The method comprises the steps of generating a virtual phone on a screen of a personal computer, said virtual phone having a shape, key arrangement and functionality substantially similar to those of a known mobile phone (the terms "mobile phone" and "actual phone" are interchangeable"); virtually selecting a desired number and sequence of keys of said virtual phone or entering commands by means of an input device of said computer to said virtual phone that are needed to define a type and recipient of a session to be established; and establishing said session by means of a voice over Internet Protocol (VoIP) application residing on said computer.

A set-up module for remotely interfacing with a virtual phone generating server may be downloaded to the computer.

In one embodiment, the step of generating a virtual phone on a screen of a personal computer is performed by receiving user specific mobile phone data (USMPD) associated with a mobile phone, downloading generic mobile phone data (GMPD) associated with said mobile phone from a remote virtual phone generation database, and suitably interfacing said USMPD with said GMPD by means of a set-up module residing on the computer whereby to generate the virtual phone.

In one aspect, the USMPD is synchronized, received by a virtual phone generator website, and downloaded to the set-up module together with the GMPD.

In one aspect, the USMPD of the virtual phone is updated when the mobile phone is detached from the computer, or alternatively, when the mobile phone is connected to the computer. The USMPD of the virtual phone is updated by virtually selecting a desired number and sequence of keys of the virtual phone or entering commands by means of the input device, whereupon the USMPD of the mobile phone is updated In one embodiment, the step of generating a virtual phone on a screen of a personal computer is performed by accessing a set-up module residing on the computer; selecting, from a list of virtual phones stored in a remote virtual phone generation database, a virtual phone with which he is desirous to interface; downloading GMPD associated with said selected virtual phone; entering USMPD; and suitably interfacing said entered USMPD with said downloaded GMPD by means of said set-up module whereby to generate the virtual phone.

A user may also interact with menu settings and applications associated with the virtual phone by virtually selecting a desired number and sequence of keys of the virtual phone.

In one aspect, a processor of the computer determines and displays an amount of savings that were realized relative to costs normally charged by a wireless service provider by establishing the session by means of the virtual phone.

The USMPD is selected from the group consisting of a mobile phone number, a contact list, mobile phone definitions, and a hardware identifier.

The present invention is also directed to a system for establishing a free or relatively inexpensive communications session while interfacing with personalized settings and contact lists similar to those of a known mobile phone, comprising a virtual phone generation (VPG) server comprising a database in which is stored GMPD associated with a hardware identifier of a plurality of mobile phones that are displayable in a corresponding VPG website; and a personal computer in communication with said VPG server via a data network, said computer comprising a local memory device in which is storable USMPD of a known mobile phone and an input device for selecting a desired mobile phone displayed in said VPG website and for downloading the GMPD associated with said selected phone to said memory device. A set-up module for interfacing said USMPD and GMPD whereby to generate a virtual phone and a VoIP application for establishing a communication session by means of said generated virtual phone are also stored in said local memory and are executable by means of a processor of said computer. A desired number and sequence of keys of said generated virtual phone are virtually selectable or commands are enterable by means of said input device to said generated virtual phone in order to define a type and recipient of a session to be established.

In one embodiment, the VPG server is also in data communication with a synchronization markup language (SyncML) server, USMPD being synchronizable from the known mobile phone, transmittable from said SyncML server to the VPG server and being downloadable together with the selectable GMPD to the memory device of the computer.

DETAILED DESCRIPTION OF PREFERRED EMBODIMENTS

The present invention is a unique method for establishing a free or low cost communications session by means of a VoIP application, including but not limited to incoming/outgoing calls, text messaging transmissions, and video chats (hereinafter a "session") while interfacing with personalized settings and contact lists similar to those of a user's mobile phone (hereinafter the "mobile phone"). After the mobile phone is connected to a personal computer, an image similar in shape and provided with a key arrangement corresponding to the relative position of the keys of the mobile phone is generated on the screen of the personal computer (hereinafter a "virtual phone"). The session is initiated by sequentially selecting portions of the computer screen by means of a pointing device (hereinafter "virtually selecting") corresponding to the keys of the mobile device that would normally be depressed if the mobile phone were disconnected from the personal computer (hereinafter "conventionally operating") and communication packets were transmitted thereby via a wireless network. As a key of the mobile phone is virtually selected, the tone emitted by the conventionally operating mobile phone is emitted by the personal computer. Similarly, a menu appearing on the screen of the conventionally operating mobile phone when a predetermined number and sequence of keys are depressed will appear on the screen of the personal computer, and within the boundaries of the screen of the virtual phone, when a corresponding number and sequence of keys are virtually selected. The personal computer will transmit communication packets by means of the VoIP application in response to the menu option that was virtually selected. Thus a user may establish a free or low cost session while benefiting from the familiarity and personalization of a conventionally operating mobile phone.

Figure 1:
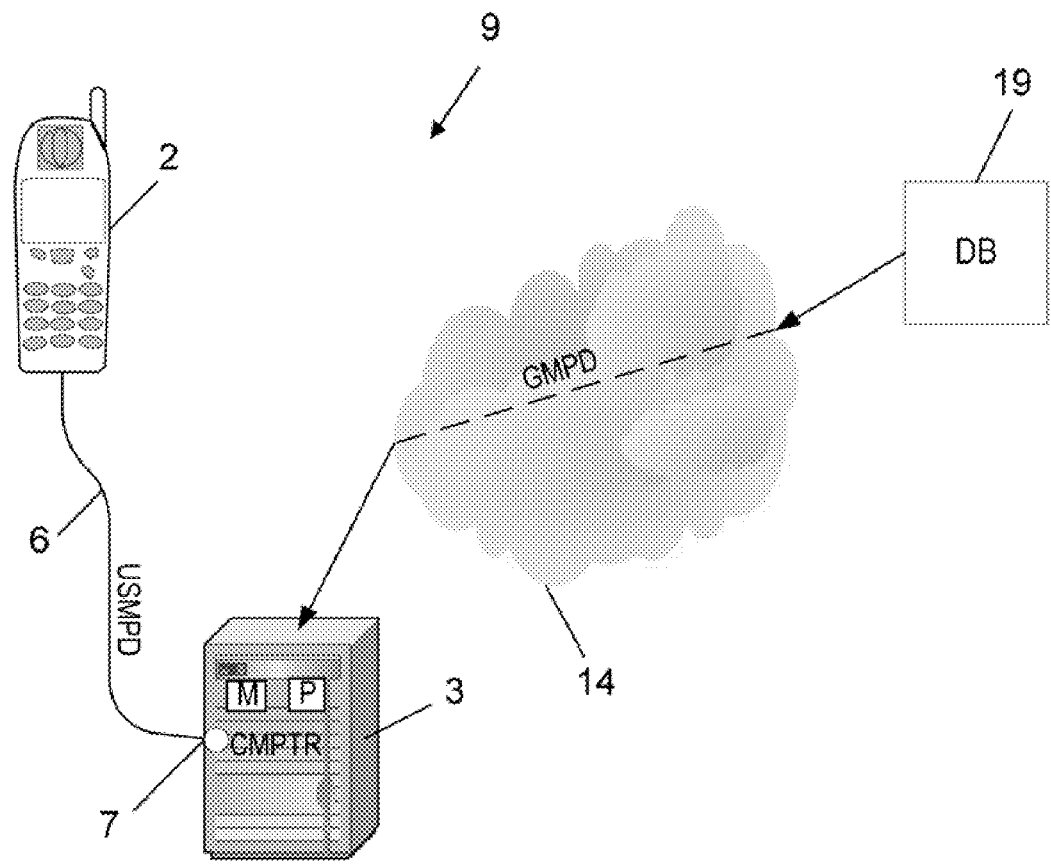
FIG. 1 is a schematic illustration of a system for generating a virtual phone, according to one embodiment of the invention.

FIG. 1 illustrates a system 9 for generating a virtual phone. After a mobile phone 2 is connected to a personal computer 3, e.g. via Universal Serial Bus (USB) port 7, by means of cable 6 or by wireless means, e.g. by means of a Bluetooth transceiver, user-specific mobile phone data (USMPD) is transmitted from mobile phone 2 to memory M of computer 3. The USMPD that is transmitted to computer 3 includes the following: (a) the mobile phone number, which is identifiable even after the session has been established by means of the VoIP application, (b) a contact list, including the phone number and relevant information of many people known to the user, (c) mobile phone definitions, including language, date, time, speed dialing, ring tones, and configurations, and (d) a hardware identifier, which is indicative of the mobile phone model type.

Following receipt of the USMPD, personal computer 3 downloads via a data network 14, e.g. the Internet, generic mobile phone data (GMPD) associated with the hardware identifier of mobile phone 2 from a database 19 of a virtual phone generation (VPG) server. The GMPD for a plurality of mobile phones is stored in VPG database 19, a working agreement generally having been established with the manufacturer of each mobile phone model type. As referred to herein, "generic mobile phone data" is that data which is indicative of the configuration of a given mobile phone and of its keypad and of default functionality of the mobile phone. A thin-client application for remotely accessing one or more applications of the VPG server and that does not include the bulk of the remote application's logic (hereinafter a "set-up module"), which resides in memory M of personal computer 3 and is executable by means of processor P, receives the USMPD and GMPD, and thereby generates a virtual phone with which the user interfaces when establishing a session.

Figure 2:
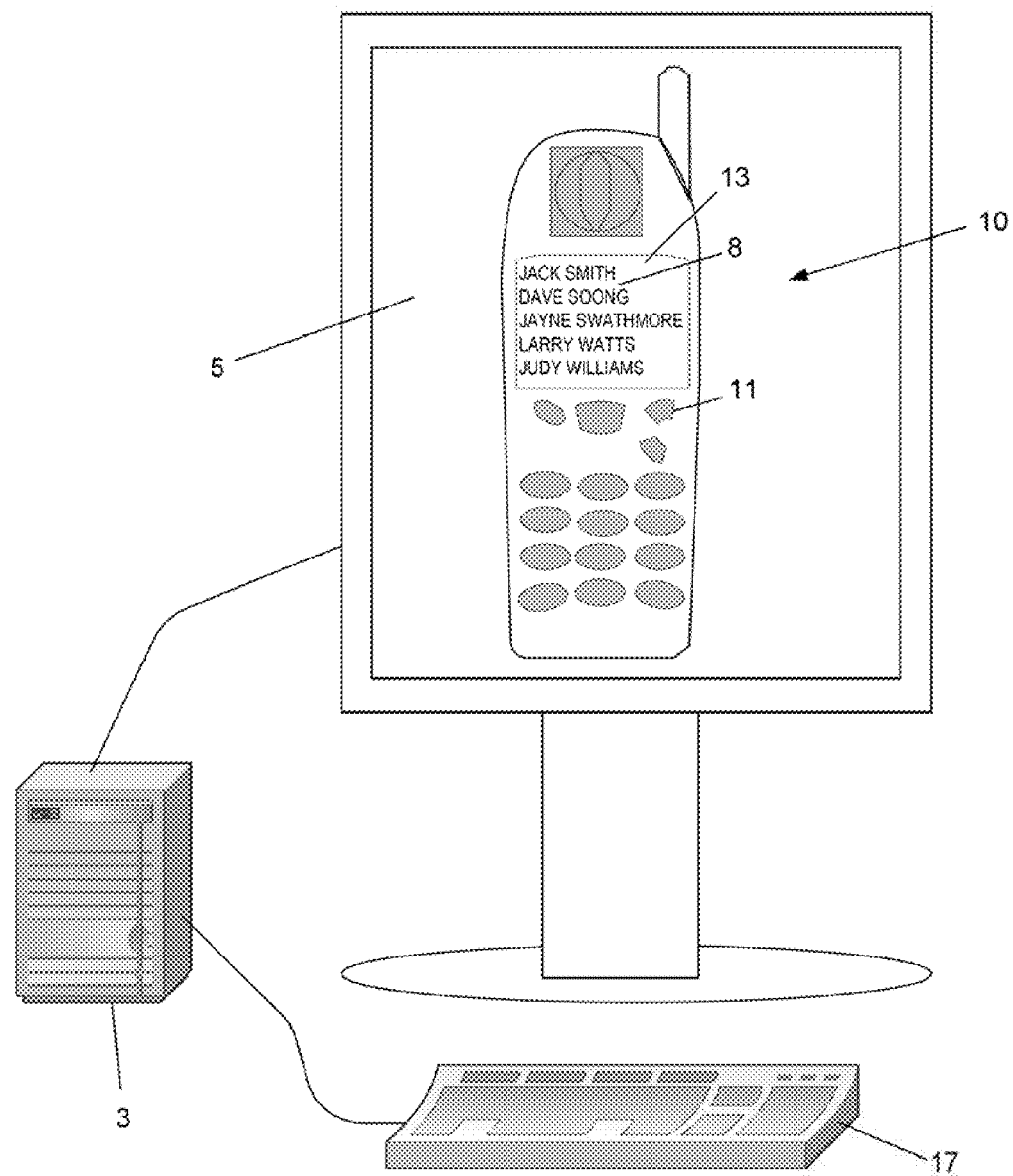
FIG. 2 schematically illustrates a virtual phone being displayed on a screen of a personal computer.

In FIG. 2, the image of a virtual phone 10 is shown to be generated on the screen 5 of a personal computer 3. A contact list 8 is displayed within screen 13 of virtual phone 10 after a predetermined number and sequence of keys 11 have been virtually selected. A session will be established by means of a VoIP application, which resides in the memory of computer 3 and is executable by the processor thereof, after one of the contact people is virtually selected and then the "SEND" button is virtually selected. Alternatively or in addition, an outgoing call may be placed, or any other desired session may be established, by depressing a selected number and sequence of keys of keypad 17 connected to computer 3. The VoIP application may support any commercially available VoIP provider such as Skype, Jajah and Lycos, or alternatively, may be an application dedicated to interface with a virtual phone.

Figure 3:
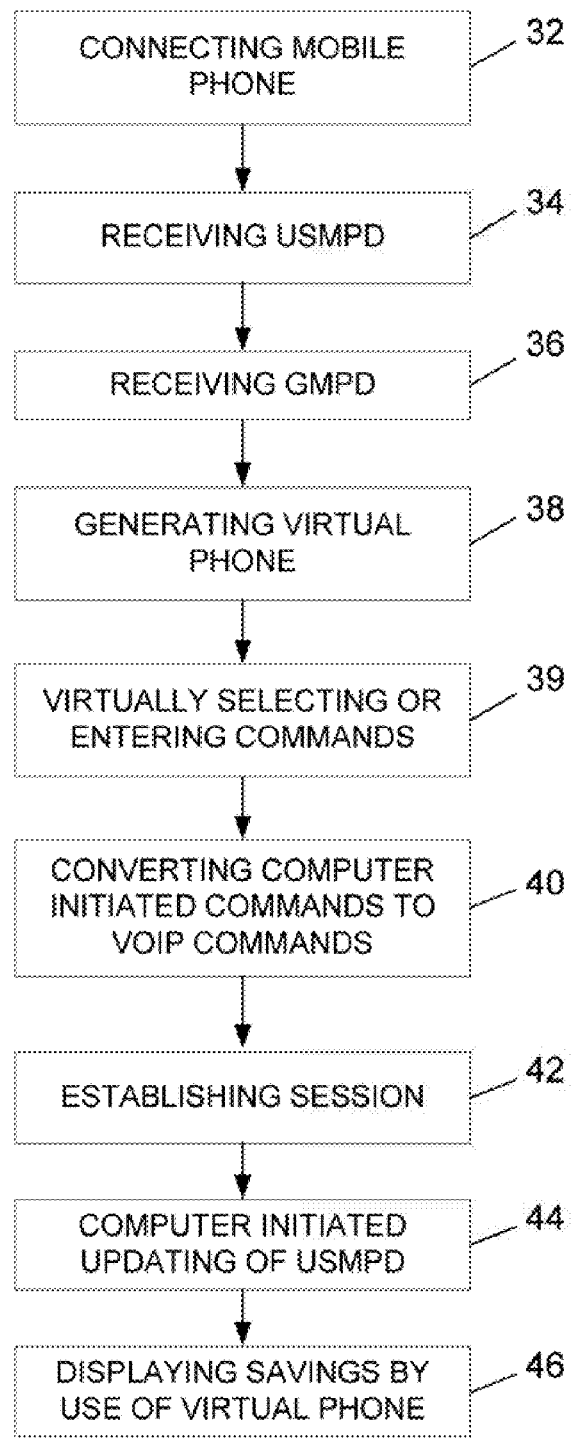
FIG. 3 is a method for establishing a session, according to one embodiment of the invention.

FIG. 3 illustrates a method for establishing a session, according to one embodiment of the invention. After the mobile phone is connected to the personal computer in step 32, the set-up module receives the USMPD of the mobile phone in step 34 and the GMPD in step 36, as described hereinabove. The set-up module then generates the virtual phone in step 38 according to predetermined criteria by interfacing the USMPD with the GMPD. When a user in step 39 virtually selects a desired number and sequence of keys, or enters commands by means of a keyboard or any other input device, in order to establish a session to a desired recipient, a conversion module residing in the personal computer converts the computer initiated commands to VoIP commands in step 40, whereupon the session is established in step 42.

In addition to establishing sessions, a user may perform the same functions by interacting with the virtual phone and virtually selecting a corresponding predetermined number and sequence of keys as would be performed with a conventionally operating mobile phone. Consequently, for example, the contact lists or any other USMPD can be updated in step 44 by computer initiated commands. The actual contact list of the mobile phone will also be updated when connected to the personal computer. Alternatively, a user may interact with the virtual phone when the mobile phone is disconnected from the personal computer. In such a situation, the USMPD will be updated when the mobile phone is once again connected to the personal computer. Alternatively, for example, a user may interact with an application provided with the virtual phone, such as a media player.

In another embodiment of the invention, the user is informed of the savings that were realized by establishing a session by means of the virtual phone, to encourage the ongoing use thereof. After a session has been established, the user may be requested to enter the cost per minute, including currency type, which is normally charged by his cellular service provider when the mobile phone is being conventionally operated. The savings calculator determines the amount of money that was saved by means of the virtual phone relative to a cellular or any other wireless network and then displays this sum in step 46.

Figure 4:
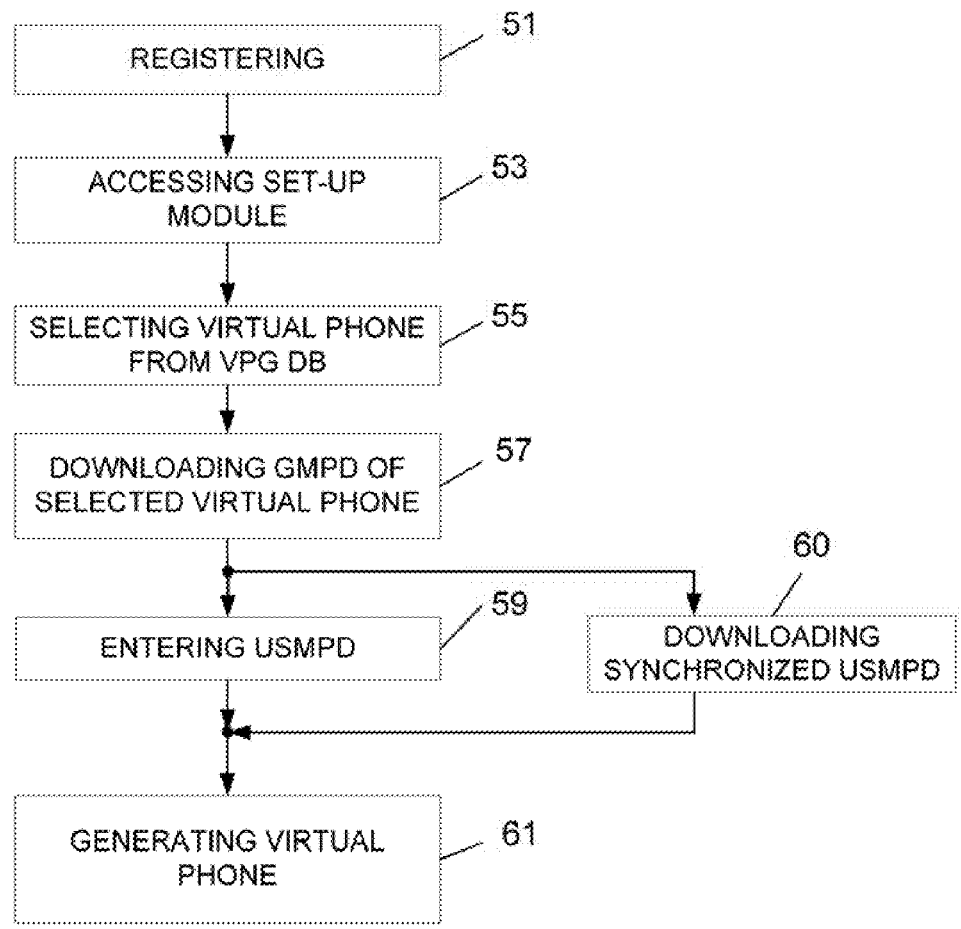
FIG. 4 is a method for interfacing with a virtual phone that is different from a user's mobile phone.

In another embodiment of the invention, as shown in FIG. 4, a user may interface with a virtual phone that is different from his mobile phone. A new user desirous of establishing a virtual phone based communication session first registers with a VPG website in step 51, whereupon a set-up module is downloaded to his personal computer. After accessing the set-up module in step 53, for example by entering a username and password, the user selects in step 55, from a list of virtual phones stored in the VPG database, a virtual phone with which he is desirous to interface. The GMPD of the selected virtual phone is then downloaded to the personal computer in step 57. The user then enters the USMPD from his actual mobile phone in step 59, for example by virtually selecting a desired number and sequence of keys, before generating a virtual phone in step 61 and establishing a session. In this fashion, mobile phone manufacturers may demonstrate and promote a mobile phone to potential customers.

The VPG website may be in data communication with a SyncML (Synchronization Markup Language) service website. When the actual phone is a SyncML-enabled phone and is in communication with the data network in communication with the SyncML website, the USMPD are automatically transmitted (hereinafter "synchronized") to the SyncML website. The USMPD will be synchronized when a user updates selected USMPD within the memory of the actual phone The synchronized USMPD are thereafter receivable upon demand by the VPG website by means of a suitable API (Application Programming Interface), and are downloaded to the set-up module in step 60 together with the downloaded GMPD in order to generate the virtual phone in step 61.

Figure 5:
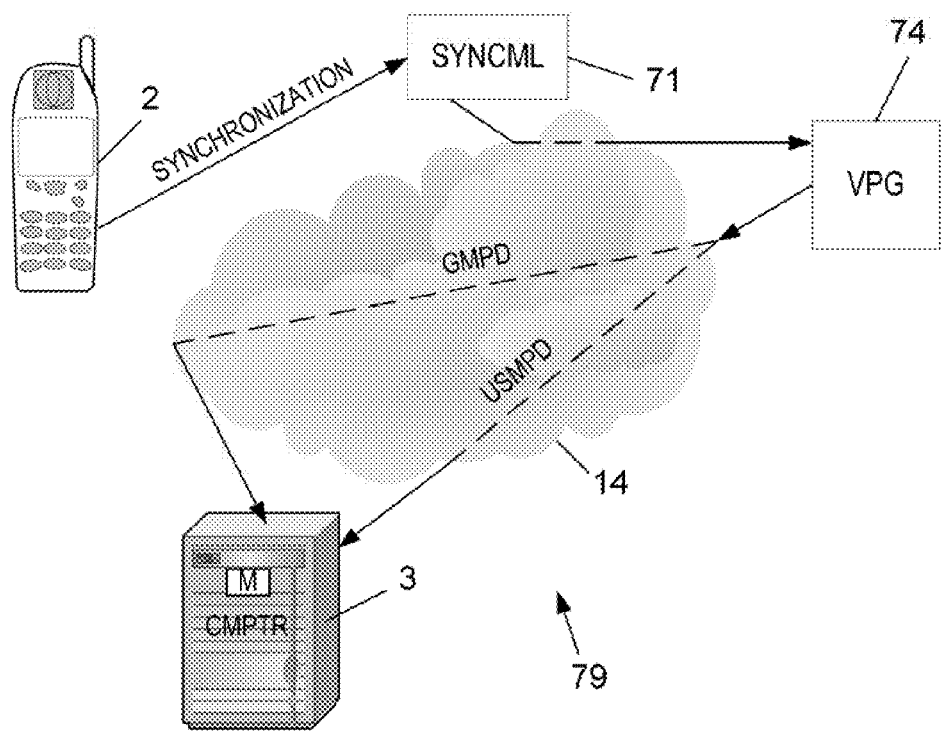
FIG. 5 is a schematic illustration of a system for generating a virtual phone, according to another embodiment of the invention.

FIG. 5 illustrates a system 79 for downloading synchronized USMPD as well as the GMPD of a selected virtual phone to memory M of personal computer 3, as described above, including actual phone 2, SyncML website 71 and VPG website 74.

By using system 79, a user may establish a VoIP based communications session from personal computer 3 to any selected mobile phone, landline phone, and personal computer. System 79 provides a comparable low cost alternative to initiating a communications session without detracting from the experience of benefiting from personalized settings.

The user may select an identifying number which is visible to the recipient of the communication system and which may be identical to the phone number of actual phone 2. Thus the recipient will be able to identify the initiator of the communication session according to the original phone number of the actual phone without having to update his stored contact list, even though the communications session was initiated by means of a virtual phone configured differently from the actual phone.

If so desired, a user may channel a communications session transmitted by an initiator via a mobile, landline, or Internet communication network, e.g. by using DID (Direct Inward Dialing) services, to computer 3, in order to benefit from the personalized settings of actual phone 2.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A method for establishing a free or relatively inexpensive communications session while interfacing with personalized settings and contact lists similar to those of a known mobile phone, comprising the steps of:
   a) generating a virtual phone on a screen of a personal computer by:
      i. accessing a set-up module residing on the computer;
      ii. selecting, from a list of virtual phones stored in a remote virtual phone generation database, a virtual phone with which a user is desirous to interface;
      iii. downloading generic mobile phone data (GMPD) associated with said selected virtual phone;
      iv. entering user specific mobile phone data (USMPD); and
      v. suitably interfacing said entered USMPD with said downloaded GMPD by means of said set-up module whereby to generate said virtual phone,
   wherein said virtual phone has a shape, key arrangement and functionality substantially similar to those of a known mobile phone;

b) virtually selecting a desired number and sequence of keys of said virtual phone or entering commands by means of an input device of said computer to said virtual phone that are needed to define a type and recipient of a session to be established; and c) establishing said session by means of a voice over Internet Protocol (VoIP) application residing on said computer.

2. The method according to claim 1, wherein a user interacts with menu settings and applications associated with the virtual phone by virtually selecting a desired number and sequence of keys of the virtual phone.

3. The method according to claim 1, wherein a processor of the computer determines and displays an amount of savings that were realized relative to costs normally charged by a wireless service provider by establishing the session by means of the virtual phone.

4. The method according to claim 1, wherein the USMPD is selected from the group consisting of a mobile phone number, a contact list, mobile phone definitions, and a hardware identifier.

5. The method according to claim 1, wherein the set-up module for remotely interfacing with a virtual phone generating server is downloaded to the computer.

6. The method according, to claim 1, wherein the USMPD of the virtual phone is updated when the mobile phone is detached from the computer.

7. The method according to claim 1, wherein the USMPD is synchronized, received by a virtual phone venerator website, and downloaded to the set-up module together with the GMPD.

8. The method according to claim 1, wherein the USMPD of the virtual phone is received or updated when the mobile phone is connected to the computer.

9. The method according to claim 8, wherein the USMPD of the virtual phone is updated by virtually selecting a desired number and sequence of keys of the virtual phone or entering commands by means of the input device, whereupon the USMPD of the mobile phone is updated.

10. A method for establishing a free or relatively inexpensive communications session while interfacing with personalized settings and contact lists similar to those of a known mobile phone, comprising the steps of:

a) generating a virtual phone on a screen of a personal computer by receiving user specific mobile phone data (USMPD) associated with a mobile phone, downloading generic, mobile phone data (GMPD) associated with said mobile phone from a remote virtual phone generation database, and suitably interfacing said USMPD with said GMPD by means of a set-up module residing on the computer whereby to generate the virtual phone, wherein said virtual phone has a shape, key arrangement and functionality substantially similar to those of a known mobile phone;

b) virtually selecting a desired number and sequence of keys of said virtual phone or entering commands by means of an input device of said computer to said virtual phone that are needed to define a type and recipient of a session to be established; and c) establishing said session by means of a voice over Internet Protocol (VoIP) application residing on said computer, wherein said USMPD is selected from the group consisting of a mobile phone number, a contact list, mobile phone definitions, and a hardware identifier.

11. The method according to claim 10, wherein the USMPD of the virtual phone is updated.

12. The method according to claim 11, wherein the USMPD of the virtual phone is updated when the mobile phone is detached from the computer.

13. The method according to claim 11, wherein the USMPD of the virtual phone is received or updated when the mobile phone is connected to the computer.

14. The method according to claim 13, wherein the USMPD of the virtual phone is updated by virtually selecting a desired number and sequence of keys of the virtual phone or entering commands by means of the input device, whereupon the USMPD of the mobile phone is updated.

15. The method according to claim 10, wherein the USMPD is synchronized, received by a virtual phone generator website, and downloaded to the set-up module together with the GMPD.

16. The method according to claim 10, wherein a user interacts with menu settings and applications associated with the virtual phone by virtually selecting a desired number and sequence of keys of the virtual phone.

17. The method according, to claim 10, wherein a processor of the computer determines and displays an amount of savings that were realized relative to costs normally charged by a wireless service provider by establishing the session by means of the virtual phone.

18. The method according to claim 10, wherein the set-up module for remotely interfacing with a virtual phone generating server is downloaded to the computer.

19. A system for establishing a free or relatively inexpensive communications session while interfacing with personalized settings and contact lists similar to those of a known mobile phone, comprising:

a) a virtual phone generation (VPG) server comprising a database in which is stored GMPD associated with a hardware identifier of a plurality of mobile phones that are displayable in a corresponding VPG website; and b) a personal computer m communication with said VPG server via a data network, said computer comprising a local memory device in which is storable USMPD of a known mobile phone and an input device for selecting a desired mobile phone displayed in said VPG website and for downloading the GMPD associated with said selected phone to said memory device, wherein a set-up module for interfacing said USMPD and GMPD whereby to generate a virtual phone and a VoIP application for establishing a communication session by means of said generated virtual phone are also stored in said local memory and are executable by means of a processor of said computer, wherein a desired number and sequence of keys of said generated virtual phone are virtually selectable or commands are enterable by means of said input device to said generated virtual phone in order to define a type and recipient of a session to be established.

20. The system according to claim 19, wherein the VPG server is also in data communication with a synchronization markup language (SyncML) server, USMPD being synchronizable from the known mobile phone, transmittable from said SyncML server to the VPG server and being downloadable together with the selectable GMPD to the memory device of the computer.

\* \* \* \* \*